US011452038B2

(12) United States Patent
Winson

(10) Patent No.: US 11,452,038 B2
(45) Date of Patent: Sep. 20, 2022

(54) POWER CONSERVING LOCAL WIRELESS NETWORK

(71) Applicant: AGSENSIO PTY LTD, Wagga Wagga (AU)

(72) Inventor: Daniel Winson, Wagga Wagga (AU)

(73) Assignee: Agsensio Pty Ltd, Wagga Wagga (AU)

( * ) Notice: Subject to any disclaimer, the term of this patent is extended or adjusted under 35 U.S.C. 154(b) by 0 days.

(21) Appl. No.: 16/964,938

(22) PCT Filed: Feb. 22, 2019

(86) PCT No.: PCT/AU2019/050153
§ 371 (c)(1),
(2) Date: Jul. 24, 2020

(87) PCT Pub. No.: WO2019/161456
PCT Pub. Date: Aug. 29, 2019

(65) Prior Publication Data
US 2021/0045055 A1 Feb. 11, 2021

(30) Foreign Application Priority Data

Feb. 23, 2018 (AU) .............................. 2018900580

(51) Int. Cl.
*H04W 52/02* (2009.01)
*H04W 36/00* (2009.01)
(52) U.S. Cl.
CPC . *H04W 52/0206* (2013.01); *H04W 36/00837* (2018.08); *H04W 52/0219* (2013.01); *H04W 52/0274* (2013.01)
(58) Field of Classification Search
CPC . H04W 52/00; H04W 52/02; H04W 52/0206; H04W 52/0212; H04W 52/0219;

(Continued)

(56) References Cited

U.S. PATENT DOCUMENTS 8,027,282 B2 * 9/2011 Boehnke ................ G08C 17/02
370/311
8,363,596 B2 1/2013 Wang et al.
(Continued)

OTHER PUBLICATIONS

International Search Report, dated Apr. 23, 2019 in International Application No. PCT/AU2019/050153, filed Feb. 22, 2019, in 3 pages.

(Continued)

*Primary Examiner* — Chi H Pham
*Assistant Examiner* — Vladislav Y Agureyev
(74) *Attorney, Agent, or Firm* — Knobbe Martens Olson & Bear LLP

(57) ABSTRACT

A low aggregate power consumption wireless communication network comprising: a plurality of wireless transceiver subsystems systems configured for distributed installation within a physical region, each transceiver subsystem comprising: a listening device configured to receive radio frequency transmissions; a wireless transceiver; and a power controller operatively connected to the listening device and the wireless transceiver, the power controller being configured to cause the wireless transceiver to assume a low power sleep state and transition to an awake state in response to a trigger from the listening device, the listening device being configured to monitor received transmissions for a network access request signal, indicative of a need for utilisation of the wireless transceiver, and in response to receiving the network access request signal, trigger the power controller to cause transition of the transceiver from a sleep state to an awake state, whereby network communication functionality is enabled for the subsystem.

19 Claims, 8 Drawing Sheets

(58) Field of Classification Search
CPC ......... H04W 52/0225; H04W 52/0251; H04W 52/0274; H04W 36/00837; H04W 88/04; H04W 88/06; H04W 88/10; H04W 88/16; H04W 40/04; H04W 84/005; H04W 48/18; Y02D 30/70
See application file for complete search history.

(56) References Cited

U.S. PATENT DOCUMENTS

| | | | |
|---|---|---|---|
| 9,420,490 B2* | 8/2016 | Jia | H04L 5/001 |
| 2004/0204181 A1 | 10/2004 | Cromer et al. | |
| 2005/0282573 A1 | 12/2005 | Maeno | |
| 2007/0192437 A1 | 8/2007 | Wang | |
| 2009/0204265 A1* | 8/2009 | Hackett | G05B 19/4185 700/284 |
| 2010/0067421 A1* | 3/2010 | Gorokhov | H04W 52/0206 370/311 |
| 2010/0067422 A1* | 3/2010 | Kadous | H04W 52/0229 370/311 |
| 2010/0094583 A1* | 4/2010 | Borean | H04L 67/12 702/142 |
| 2010/0216523 A1* | 8/2010 | Sebastiano | H04W 52/0229 455/574 |
| 2011/0116429 A1* | 5/2011 | Jeon | H04W 52/0216 370/311 |
| 2012/0072751 A1* | 3/2012 | Das | H04W 76/45 713/323 |
| 2013/0137432 A1* | 5/2013 | Wong | H04W 36/0079 455/436 |
| 2013/0189932 A1* | 7/2013 | Shen | H04W 52/0232 455/68 |
| 2013/0210434 A1* | 8/2013 | Dimou | H04W 36/00837 455/436 |
| 2014/0112226 A1* | 4/2014 | Jafarian | H04W 52/0225 370/311 |
| 2014/0112229 A1* | 4/2014 | Merlin | H04L 5/0055 370/311 |
| 2014/0155115 A1* | 6/2014 | Keshavarzian | H04W 52/0235 455/517 |
| 2014/0254445 A1* | 9/2014 | Heinzelman | H04W 52/0235 370/311 |
| 2014/0295761 A1* | 10/2014 | Lo | H04L 63/0428 455/41.2 |
| 2015/0126196 A1* | 5/2015 | Lu | H04W 36/0072 455/437 |
| 2015/0282069 A1* | 10/2015 | Hobbs | H04W 24/02 370/252 |
| 2016/0029407 A1* | 1/2016 | Soldati | H04W 52/0206 370/329 |
| 2016/0135123 A1* | 5/2016 | Soldati | H04W 52/0229 370/311 |
| 2016/0150474 A1* | 5/2016 | Ang | H04W 52/0293 370/311 |
| 2016/0374029 A1* | 12/2016 | Flynn | H04W 52/221 |
| 2017/0070953 A1* | 3/2017 | Kim | H04W 12/06 |
| 2017/0070959 A1* | 3/2017 | Khazanov | H04W 52/0235 |
| 2017/0215128 A1* | 7/2017 | Shamis | H04W 4/02 |
| 2017/0223601 A1* | 8/2017 | Egner | H04W 4/80 |
| 2017/0330000 A1* | 11/2017 | Durand | G06K 7/10207 |
| 2018/0041895 A1* | 2/2018 | Barcala | H04W 4/12 |
| 2018/0167864 A1* | 6/2018 | Johnston | H04W 40/244 |
| 2018/0220380 A1* | 8/2018 | Croux | E21B 47/14 |
| 2018/0242246 A1* | 8/2018 | Ryu | H04W 76/10 |
| 2019/0182767 A1* | 6/2019 | Deng | H04B 7/0617 |
| 2019/0306880 A1* | 10/2019 | Ribeiro Blard | H04W 52/265 |
| 2021/0217259 A1* | 7/2021 | Odejerte, Jr. | H04W 4/027 |

OTHER PUBLICATIONS

Mishra et al., "Wake-on-WLAN". WWW'06: Proceedings of the 15th International Conference on World Wide Web, May 2006, pp. 761-769.

* cited by examiner

Figure 3 - example of a first use scenario for an embodiment of a long range low aggregate power network
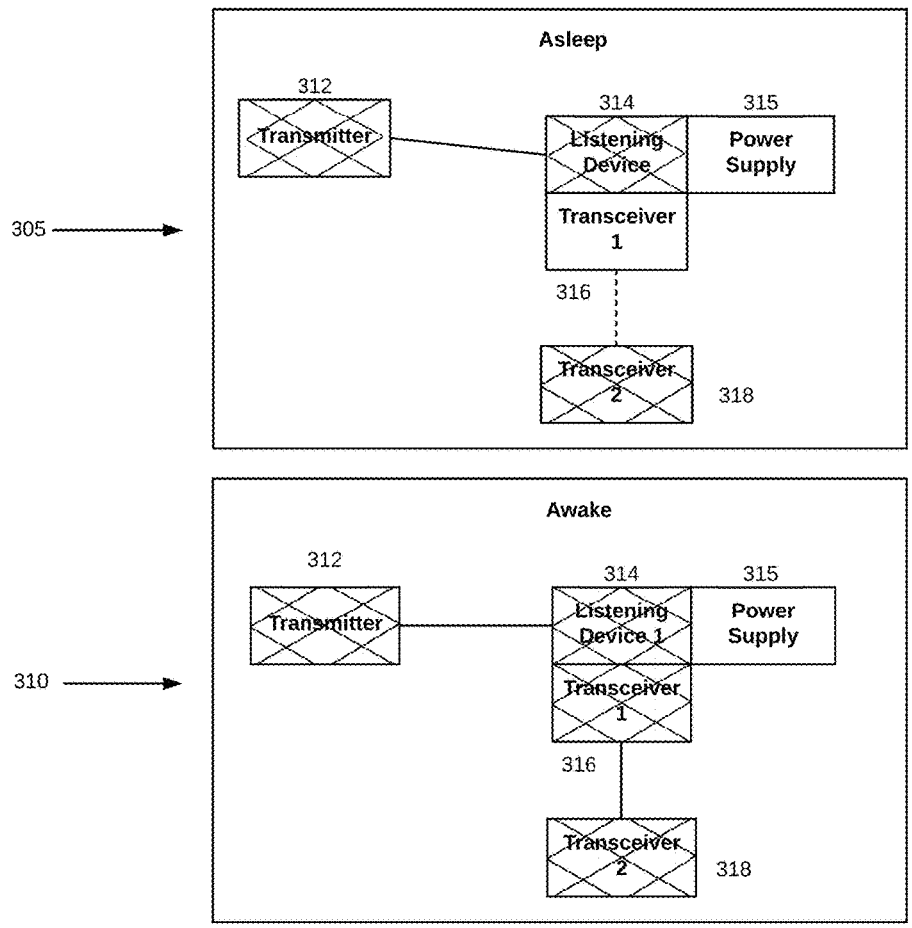
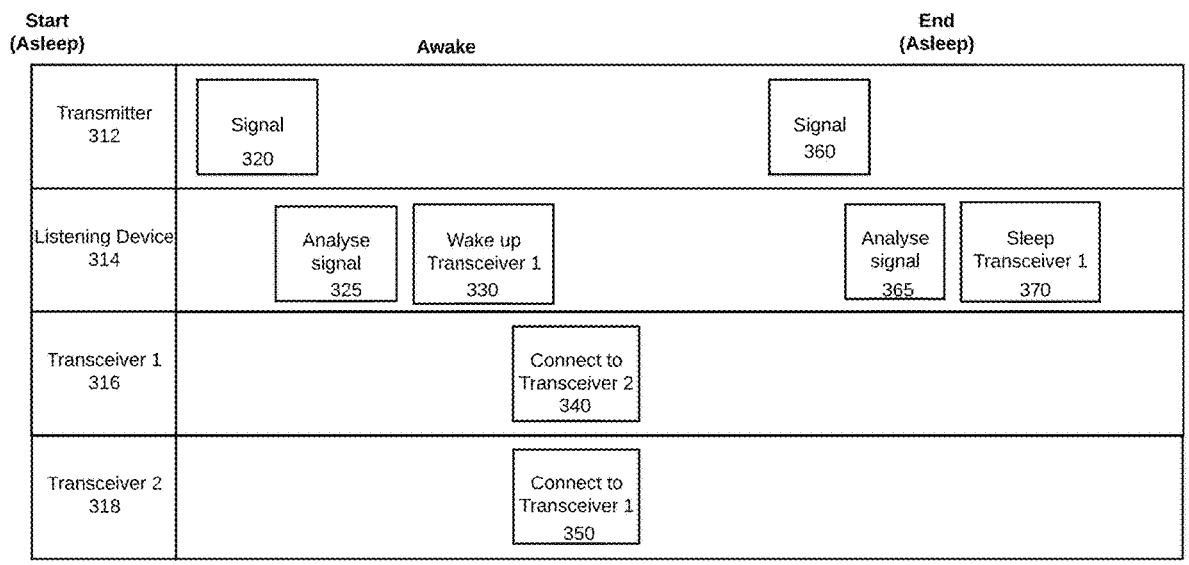

Figure 7b

SSID Format Table

| DEVICE TYPE - used to define type of device seeking a gateway or existence of an offer of path to gateway or existing path to gateway currently n use<br><br>C\|B\|G\|O\|N\|S<br><br>Client<br>Bridge<br>Gateway<br>Network<br>Internetwork<br>Sleep | LOCAL POWER STATUS - used to describe current approximate power available to local device<br><br>0-9<br><br>0 - unknown<br>1 - <12v<br>2 - 12v-12.2v<br>3 - 12.21v-12.5v<br>4 - 12.51v-12.8v<br>5 - 12.81v-13v<br>6 - 13.01v-13.4v<br>7- >13.4v<br>8 - reserved<br>9 - 240v system | NETWORK POWER STATUS - only used for network/internetwork device types. used to indicate average power available on current path to gateway<br><br>0-9<br><br>0 - unknown<br>1 - <12v<br>2 - 12v-12.2v<br>3 - 12.21v-12.5v<br>4 - 12.51v-12.8v<br>5 - 12.81v-13v<br>6 - 13.01v-13.4v<br>7- >13.4v<br>8 - reserved<br>9 - 240v system | NETWORK HOPS - only used for network /internetwork device types. used to indicate current path to gateway.<br><br>HOP1,<br>HOP2,<br>HOPn |
|---|---|---|---|

POWER CONSERVING LOCAL WIRELESS NETWORK

CROSS REFERENCE TO RELATED APPLICATIONS

The present application is a U.S. national phase application under 35 U.S.C. § 371 of International Application No. PCT/AU2019/050153, filed on Feb. 22, 2019 and published as WO 2019/161456 A1 on Aug. 29, 2019, which claims priority to AU Application No. 2018900580, filed on Feb. 23, 2018. The content of each of these applications is incorporated herein by reference in its entirety.

The following relates generally to wireless networks, and in particular to system architecture to implement private or restricted access wireless networks. An example of an application of the invention is long range high bandwidth networks using WiFi or similar wireless technologies.

BACKGROUND

Local area networks (LANs) typically consist of nodes (e.g. computers and IP cameras) and internetworking devices (e.g. switches and routers) connected by physical media (e.g. twisted pair wire, or optical fiber). Wireless local area networks (WLANs) typically consist of one or more Wireless Access Points (APs) that connect to wireless devices (e.g. notebooks, phones and tablets). APs broadcast a Service Set Identifier (SSID) to differentiate their network from other networks.

Long range wireless networks typically comprise multiple APs configured in a point to point, point to multipoint or mesh topology to enable the inter-connection of multiple LANs and/or WLANs. There is an increasing desire for such long range networks to support a wide range of services—voice/video/internet browsing—requiring high bandwidth.

Long range wireless networks are frequently used in locations without mains power, for example in rural areas. In such cases it is necessary to generate and store power for the AP and any other remotely connected equipment (e.g. IP cameras or sensors). Often renewable energy type generators such as solar panels or wind generators with battery storage systems are used to provide power to APs and remotely connected equipment. These generators must be appropriately sized and configured to enable equipment power requirements to be satisfied during all conditions. This adds significant cost to installing long range wireless networks and may also significantly increase lifetime maintenance costs for the network. For example, the hardware cost for a mains power connected WiFi access point may be around $100, however the additional cost to install the same WiFi access point with a solar power generator may require an additional $1000 for the solar equipment. Further, for some power supply technologies the area required for the generator to produce sufficient energy to fulfil requirements may be relatively large, for example several solar photovoltaic panels maybe required for each AP, which may be undesirable. For example, on a farm solar panels may reduce available cultivation area, and/or obstruct/inconvenience operation of other equipment, such as harvesters etc.

For installations where the AP power supply is battery only (no renewable energy generator) battery life and replacement is a problem, which may be exacerbated by high bandwidth data hungry use.

It is therefore desirable to reduce power requirements for such long range wireless networks.

SUMMARY OF THE INVENTION

One aspect provides a low aggregate power consumption wireless communication network comprising:
 a plurality of wireless transceiver subsystems systems configured for distributed installation within a physical region, each transceiver subsystem comprising:
 a listening device configured to receive radio frequency transmissions;
 a wireless transceiver; and
 a power controller operatively connected to the listening device and the wireless transceiver, the power controller being configured to cause the wireless transceiver to assume a low power sleep state and transition to an awake state in response to a trigger from the listening device,
 the listening device being configured to monitor received transmissions for a network access request signal, indicative of a need for utilisation of the wireless transceiver, and in response to receiving the network access request signal, trigger the power controller to cause transition of the transceiver from a sleep state to an awake state, whereby network communication functionality is enabled for the subsystem.

In some embodiments each subsystem while in the awake state is configured to transmit a network access request signal, whereby wake up of at least one other substation within range of the network access request signal is triggered.

In some embodiments of the low aggregate power consumption wireless communication network one or more of the subsystems are configured to transmit an access request signal to selectively cause wake up of another substation.

In some embodiments of the low aggregate power consumption wireless network at least one substation is configured to connect with a second network providing access to a public communication network.

In one embodiment on transitioning to a wake state the transceiver is configured to determine whether or not the subsystem is receiving signals from another active substation or a substation of a second network, and determine whether the substation is to operate to act as a relay between substations and the second network. Each substation can also be configured to trigger wake up of one or more substations in accordance with a target network topology to establish a communication path between the second network and an end user device used to access the network via a substation.

In some embodiments of the low aggregate power consumption wireless network as described above the network access request signal monitored by the listening device may be characterised by any one or more of: one or more specified frequencies, SSID, bridge interaction.

In some embodiments the listening device is configured to operate in any one of the following modes while monitoring for network access request signals: always on, periodic scanning, or intermittent sleep.

In some embodiments while in the wake state the transceiver is configured to monitor for cease of communication via the transceiver and trigger transition to the low power sleep state.

In some embodiments a sleep signal is transmitted by the transceiver before transitioning to the low power sleep state to optionally cause a transition sleep state of other substations where these are not active for another communication via another substation.

In some embodiments transceivers can be configured to monitor signal power and trigger a handover to another substation in response to low signal power, wherein the listening device of each substation is configured to receive handover signalling as a network access request and if the substation is in the sleep state trigger transition of a substation to a wake state for the handover.

In some embodiments of a low aggregate power consumption wireless network one or more subsystems are configured for connection of peripheral devices, and the power controller is further configures to control transitioning of peripheral devices between awake and sleep states.

In some embodiments the power controller can be configured to transition the peripheral devices between awake and sleep states independently of the transceiver.

In some embodiments the power controller is configured to monitor power supply to the substation and selectively transition one or more of the transceiver and peripheral devices between wake and sleep states based on available power.

In an embodiment at least one subsystem is further configured to operate as a wireless bridge or wireless access point.

Embodiments of the low aggregate power consumption wireless network can further comprise a vehicle mounted subsystem comprising a wireless bridge or wireless access point.

Another aspect provides a wireless transceiver subsystem configured for distributed installation within a large physical region, each transceiver subsystem comprising:
  a listening device configured to receive radio frequency transmissions;
  a wireless transceiver; and
  a power controller operatively connected to the listening device and the wireless transceiver, the power controller being configured to cause the wireless transceiver to assume a low power sleep state and transition to an awake state in response to a first trigger from the listening device,
  the listening device being configured to monitor received transmissions for a network access request signal, indicative of a need for utilisation of the wireless transceiver, and in response to receiving the network access request signal, trigger the power controller to cause transition of the transceiver from a sleep state to an awake state, whereby network communication functionality is enabled for the subsystem.

In some embodiments the listening device and power controller are integrated.

In some embodiments the wireless transceiver and listening device are integrated with the listening device using only receiver functionality of the transceiver.

Embodiments of the wireless transceiver subsystem can further comprise a power supply. In some embodiments the power supply comprises one or more batteries and is connectable to a charging source. In some embodiments the charging source is a renewable energy generator.

BRIEF DESCRIPTION OF THE DRAWINGS

An embodiment, incorporating all aspects of the invention, will now be described by way of example only with reference to the accompanying drawings in which:

FIG. 3 represents an example of a first use scenario for an embodiment of a long range low aggregate power network;

DETAILED DESCRIPTION

To enable implementation of a long range network with reduced power requirements, wireless transceiver substation equipment is configured to turn on APs and/or connected equipment as they are needed so that power use can be minimised when these devices are not in use.

Embodiments provide a low aggregate power consumption wireless communication network comprising a plurality of wireless transceiver subsystems systems configured for distributed installation within a large physical region. Each transceiver subsystem comprises a listening device configured to receive radio frequency transmissions, a wireless transceiver, and a power controller. The power controller is operatively connected to the listening device and the wireless transceiver and configured to cause the wireless transceiver to assume a low power sleep state and transition to an awake state in response to a first trigger from the listening device. The listening device is configured to monitor received transmissions for a network access request signal, indicative of a need for utilisation of the wireless transceiver. In response to receiving the network access request signal, trigger the power controller to cause transition of the transceiver from a sleep state to an awake state, whereby network communication functionality is enabled for the subsystem.

Figure 1:
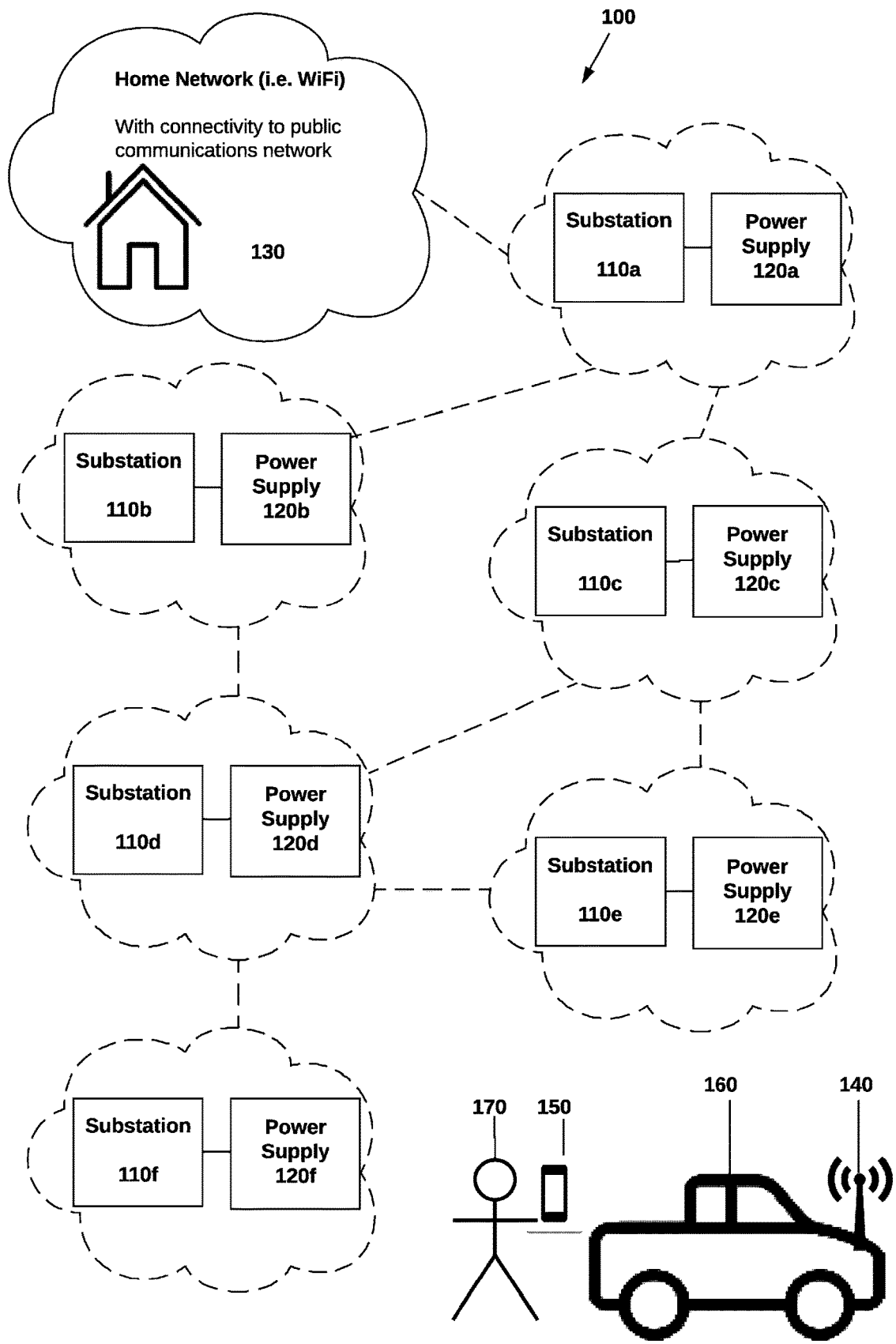
FIG. 1 is a representative schematic of an example of an installed low aggregate power long range network.

FIG. 1 is a representative schematic of an example of an installed low aggregate power long range network. The long range network 100, comprises ad plurality of substations 110*a-f* each with an independent power supply 120*a-f* installed distributed around a physical region such as a rural property. The substations are typically spaced far apart, but with each substation within range of at least one other substation. It should be appreciated that the distance between substations can vary based on installation requirements and in some installations one or more substations may be located relatively close to each other but configured to operate independently. This configuration may be chosen based on end user requirements for the network, for example to support peripheral equipment. Alternatively such configuration may be used to improve network coverage, for example, around structures or obstructions, or to enable network redundancy.

Figure 2:
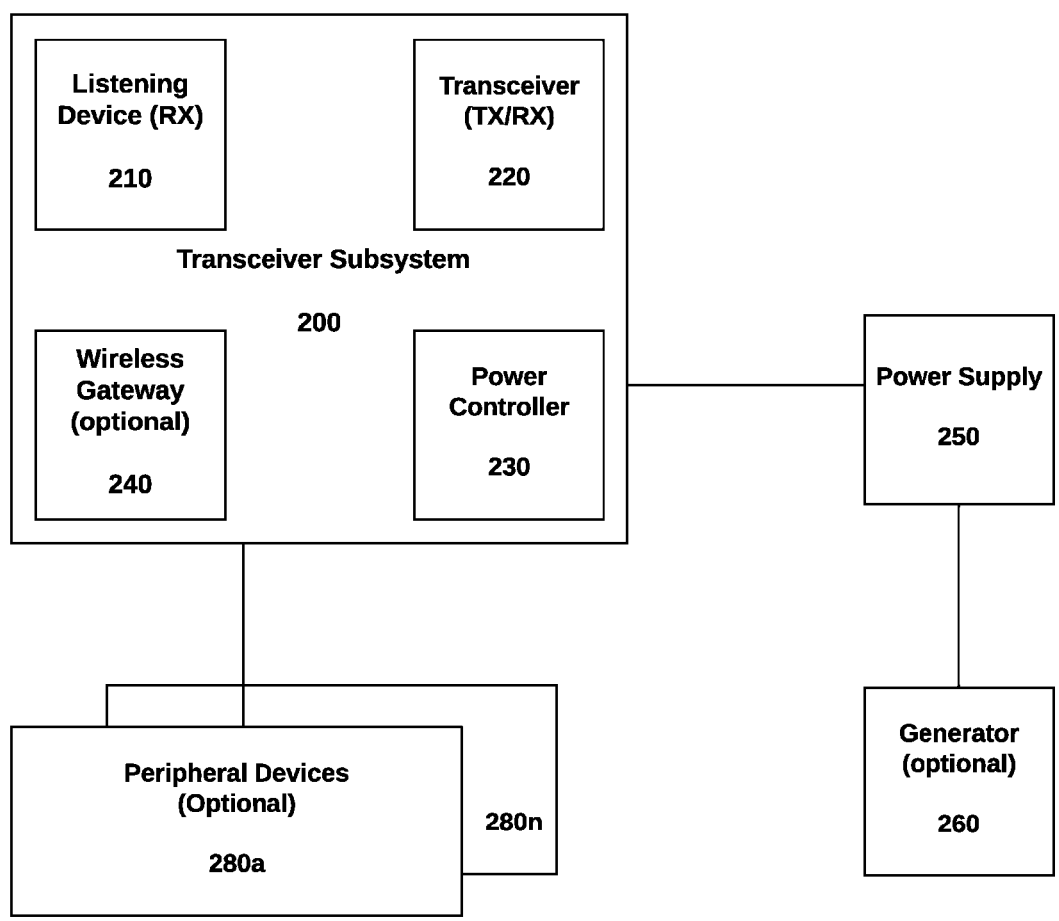
FIG. 2 is a block diagram of an example of a transceiver subsystem.

Each substation is configured to conserve energy when not actively required to support communication via the network by entering a dormant state (or sleep state)—in the figures the dormant state of a substation or communication path is represented by dotted lines. In FIG. 1 each network substation is represented within a dotted network cloud representing the substation in the sleep state. FIG. 2 is a block diagram representing components of a transceiver subsystem. The transceiver subsystem 200 includes a listening device 210 configured to receive radio frequency transmissions, a wireless transceiver 220, and a power controller 230. The substation is connected to a power supply 250, for example a battery and may also be connected to a charging source 260 such as a solar, wind or water powered generator. Some substations may be connected to mains power or connected to a reliable locally generated power supply (for example, an off grid power station for supplying power to a home or work area such as a shearing shed, having renewable energy generator with battery and/or diesel generator backup), in such circumstances the objective to minimise aggregate power usage may still apply.

The transceiver may be configured to operate as a wireless bridge—a transceiver capable of creating a high bandwidth (1 mbit or greater) link. A wireless bridge is usually expected to be 900 MHz/2.4 GHz/5 GHz or other ISM band radios that use 802.11/WiFi, or proprietary variations such as Ubiquiti Airmax or Mikrotik NV2. It should be appreciated that these products are given as non-limiting examples of products commercially available at the time of filing that may be used, alternative products or newly developed transceiver and wireless bridge hardware may also be used.

The transceiver subsystem may include or have connected various optional components providing additional functionality, for example, Bluetooth transceivers, near field communications functionality, wireless gateway 240 etc. The transceiver subsystem may also be configured to support one or more peripheral components 280*a-n*, for example cameras, weather sensors, data readers or data ports, etc. Peripheral devices may be hard wired or configured for wireless data connections. Different substations within the long range network may have different optional component configurations depending on the user requirements and chosen architecture.

The power controller is operatively connected to the listening device, wireless receiver, and any optional substation components to enable controlled transitioning between low power consumption "sleep" states and higher power awake states where transceiver operation is enabled for the substation to operate as a network access point for communication via the long range network. Further as each transceiver subsystem is configured to "wake up" independently in response to receiving a network request access signal, the system can be configured to selectively wake up only the substations required for the particular communication, allowing the other network substations to remain dormant. Thus, the active (awake) network topology can be adaptive to the nature and location of the network access request.

Such a system allows access points to wake up on demand, when needed, and conserve energy by substantially shutting down when not required. In this manner battery power can be preserved, and where renewable energy generators are used the batteries may also be recharged while the subsystem is dormant. For rural or low population areas where network use in a region is intermittent significant energy savings may be gained by powering down components of each independent subsystem when not actively in use for communication. In particular powering down the wireless transceiver while not required can significantly reduce power consumption.

The systems as described are designed to increase the aggregate power efficiency of off grid networks that are typically powered by battery with or without a renewable energy based recharging system. These systems are usually installed in locations that are sparsely populated, at least in comparison to cities, and as such the radio frequency environment is in general less crowded. These systems are usually installed in situations that do not require constant network operation.

Embodiments of such long range high bandwidth networks can be implemented using a number of different wireless technologies including WiFi and 802.11 compatible networks, and proprietary variations such as Mikrotik NV2 and Ubiquiti Airmax. The paragraphs describing functionality of the subsystem modules and basic operation of the transceiver subsystems described below is applicable generally to any such technologies. Some specific examples are also provided below.

The power control system is configured to monitor power and control supply of power to components of the transceiver subsystem, including controlling shutting down of subsystem components and waking up subsystem component on demand. The power controller may be implemented as a software module.

The power control system or power controller may be integrated into the listening device, the transceiver or could be stand alone. For example, the power controller may include a microprocessor or programmable the power controller (PLC) and associated circuits to which a receiver or transceiver can be connected, such an embodiment may be implemented using off the shelf hardware with software or firmware modified to implement selective shut down functions. The power controller is capable of switching the transceiver entirely (or the transceivers transmit function) on (and optionally off, although this could be set within the transceiver itself). May also have the capacity to switch other network devices on and off. May switch devices by causing an electrical circuit to be modified or may interact with a devices control system to enable or disable device functions.

A listening device is a device capable of receiving radio frequency traffic. To reduce overall power requirements of the system it would usually either only be capable of receiving traffic or have its transmission function disabled or running in a power efficient state. The general idea is that the listening device requires less power to run than the transceiver that is needed to create a functional network. The listening device may be included within the transceiver and may be a transceiver that has it's transmit function disabled or turned down while in 'listening device' mode. For example, the listening device is configured to monitor for network access requests, either by remaining "on" and to receive signals or periodically transitioning to a state where signals may be received to monitor (listen) for a network access request signal.

A listening device is configured to receive radio frequency traffic on one or more frequencies. When a signal is received to 'wake up' other devices it interacts with a power control system to create a wireless network by enabling a transceiver. The listening device or transceiver may also interact with a power control system to enable additional network devices. The listening device or transceiver could have the ability to interact with the power controller to put transceivers and network devices 'to sleep' based on signals, or lack of signals received.

A network access request may be received from any network device located within the coverage are of the network. A network device in the context of the present description is any device capable of joining the network using the protocol for which the long range network is configured, for example a WiFi, Ethernet or other high bandwidth network. Examples of network device include: IP cameras, switches, routers, modems, computers and sensors that interact directly with high bandwidth networks. One or more subsystems may also be configured with a gateway device 240. A gateway device is a device used to access an upstream internetwork such as the internet or a corporate network. The gateway device may be wired or wireless, for example a gateway for a satellite communication network access.

The network may also be configured to be accessed via devices such as mobile phones or tablet computers for voice and/or video communications via data communication protocols including voice over WiFi (VoWiFi) or voice over IP (VOIP). In some embodiments a device such as a mobile phone may also be utilised to provide functionality of components within the network, for example a mobile or satellite phone may be utilised to provide network gateway functionality to enable connection into the network, instead of requiring a stationary "home" network connection. In this embodiment the phone is programmed with software to connect to and "wake up" the power conserving network to extend connectivity of the telecommunication or satellite network to the power conserving network.

The listening device is programmed to take actions when a specific signal is received. The signal is any agreed transmission or lack of transmission that is indicative of an attempt to establish communications, or ceasing of communications for return to a dormant state. A network access request signal can be any signal indicative of a need to utilise the network. Examples of a signal might include the receipt of a beacon frame containing a particular SSID, the receipt of a frame containing other customisable information such as the radio-name proprietary extension used in the Mikrotik NV2 protocol or a specified change in the radio frequency such as the volume of traffic on a particular frequency whether or not actual frames can be successfully received. The listening device 210 can be a receiver configured to monitor all received signals to identify those that meet predetermined criteria of a network access request signal. In response to receiving a network access request signal the listening device triggers the power controller to "wake up" the transceiver subsystem.

A device such as a mobile phone 150 or wireless bridge 140 installed within a vehicle may initiate "wake up" of elements of the long range network by transmitting signals seeking network access.

In some embodiments each subsystem, while in the awake state, is configured to transmit a network access request signal, whereby wake up of at least one other subsystem is triggered. In this instance wake up of one subsystem causes the subsystem to seek to connect with a neighbouring subsystem, this may be an assess request specifically targeted to a neighbouring based on one or more stored network topographies for a dynamically configured network. For example, designed to "wake up" a selected topography for a given network access objective identifiable from an initial network access request or communication data. For example, where a network access request is for an objective of making a phone call via wireless network, the transceiver substations may be preconfigured to cause wake up of a network topology providing a desirable route to a public communication network access point—for example via a home network 130 having an access point enabling connection (wires or wirelessly) to a public communication network (i.e. PSTN) or wireless cellular network. One or more of the subsystems can be configured to transmit an access request signal to selectively cause wake up of another substation. The selectively awakened topology for routing the specific communication may be based on any one or more of: hop count, link state, speed of path, reliability of path, battery power available on path, etc. Instructions for topology wake up and routing may be stored in memory of each subsystem. Such instructions may be pre-programmed and/or updateable by a system administrator via the communication network during operation.

In some embodiments the transceiver subsystems may be configured to, on transitioning to a wake state, determine whether or not the subsystem is receiving signals from another active subsystem or a subsystem of a home network, and determine whether the subsystem is to operate to act as a relay between subsystems and the home network. For example a transceiver system may be configured to determine whether it is to operate as an access point between a home network and the long rang network or as a relay point within the long range network based on analysis of the network access request and/or predefined communication topologies for the subsystem. For example a subsystem 110*a* may be programmed to know that the subsystem 110*a* can support (when awake) a direct connection to the home network 130 and one or more 110*b*, 110*c* other subsystems. Where a network access request originates from within the home network (for example farmer seeking to access a digital camera focused on a far paddock to check the status or livestock or crops) this may be discerned by the subsystem 110*a* (based on the network access request signal) including indication (i.e. destination address) of the equipment to access. The system may be configured to trigger wake up of an efficient network topology to communicate with the destination device and subsystem initiated automatically based on the access request message and pre-programmed network topology options.

In an alternative embodiment, wake up of neighbouring subsystems may not be selective. Each subsystem may be configured to transmit a network access signal to "wake up" all transceiver subsystems within range, which in turn "wake up" further subsystems. Communication may then be routed through active (awake) subsystems in accordance with known routing protocols. Each subsystem can be configured to monitor utilisation and revert to a dormant/sleep state if not utilised for communication. Thus, the long range network topology may be dynamically configured and reconfigured in response to communication needs. Transceiver subsystems can be powered down and enter a low power consumption dormant state when not in use.

The transceiver subsystem power supply can be any suitable source of power, typically battery power, with or without a charging system. Charging systems are typically renewable energy power generator, for example photovoltaic (PV) solar panels, wind generators etc. The transceiver subsystem is typically powered by the battery, which will drain while the transceiver subsystem is awake actively utilised for communications. The renewable energy generator charges the battery, and may also be configured to provide power directly to the subsystem. It should be appreciated that renewable energy supply may be intermittent—for example solar panels cease to generate power at night or wind generators cannot produce power in still conditions. Thus, the battery is typically the main source of power the system aims to conserve.

The following paragraphs provide some worked "use case" examples of the adaptive power conserving network.

General Example (FIG. 3)

FIG. 3 represents an example of a first use scenario for an embodiment of a long range low aggregate power network.

In this example:
1. While in a sleep state 305 a Listening Device 314 (represented as awake by the hashed lines) is configured to receive radio frequency traffic.
2. In this example the Listening Device 314 is integrated with a power control system 315 that can wake up and sleep Transceiver 1 316. The listening device 314 is configured to analyse received signals to determine whether or not to trigger power up of the transceiver to enable full communication functionality. For example the listening device may comprise a wireless receiver and microprocessor for signal analysis.
3. A transmitter 312 sends a signal 320 that is analysed 325 by the listening device 314. A transmitter 312 sends a signal 320 that is received and analysed 325 by the listening device 314. In an example, the signal 320 can carry information identifying the transmitter of the signal, the current network status of the transmitter of the signal, the power status of the transmitter of the signal and the desired network status of the transmitter of the signal. This information is used by the listening device 314 to determine whether to trigger power up or power down of other devices. This information can also be utilised by the device controller to determine what, if any, signals should be transmitted by devices that are woken up or left awake.
4. When the signal 320 indicates the network is required the listening device 314 triggers wake up 330 of Transceiver 1 316 and the subsystem transitions to a wake state 310. For example the SSID transmitted in a beacon frame could be crafted to contain the information required by the listener to decide next steps. The information contained within signal 320, as demonstrated in the SSID format table 720 in FIG. 7 may include information such as the current role of transmitter 312 (i.e. whether it is a stand-alone device, such as a client, a bridge or a gateway that is looking to create a network or whether it is acting on behalf of an existing network or internetwork), the current power status 312, the current power status of the upstream network and, in the case of 312 acting on behalf of a converged network the hops that are currently in use by that network to access upstream networks. It should be appreciated that in some embodiments the signal 320 may change over time to reflect the requirements of the network based on the most desirable path for communications based on hop count, power capacity, speed, signal strength, reliability or other metrics.
5. Transceiver 1 316 connects to Transceiver 2 318 creating a network.
6. When the network is no longer required the network may be returned to a dormant state, only listening for communication requests. In one embodiment, return to a dormant state may be triggered by a signal 360 being sent by the transmitter 1 312 that is analysed 365 by the listening device 314. This signal 360 can include information indicating that the network is no longer required, for example a change in information conveyed by the SSID (changing the SSID from X to Y indicating that the connection is no longer required). Alternatively a signal may consist of the ceasing of the transmission of the SSID signal that is being used to create the network. In this embodiment, the network will be in a 'normally off' state. A network will only be created while signal 320 is transmitted by transmitter 312. The lack of a regular receipt of signal 320 by listening device 314 would be interpreted as signal 360 indicating a network is not required.
7. The analysis 314 by listening device 314 determines that the communication is terminated and triggers putting Transceiver 1 316 back to sleep 370 and thus reverting to the sleep state 305. This may be accomplished by disabling the transmit function of Transceiver 1 316, by powering off Transceiver 1316 or by disabling the power supply to Transceiver 1 316.

The above example assumes that the communication termination signal 360 is sent from transmitter 1 312 as this device has the closest contact to the end user initiating the communication in this scenario. However, there signal indicating close of communication may be received from other sources. For example, transceiver 2 318 could also notify the listening device 314 that the connection is no longer needed. Alternatively, a specific disconnection message may be broadcast.

Alternatively, the subsystem may be configured for automatic return to a dormant state after a period of inactivity. In this embodiment transmission would simply cease after communication termination and the subsystems automatically shut down after a defined waiting period. During the waiting period the subsystems will remain in a wake state (maybe with some equipment or peripherals entering lower power consumption states) and so the substation will continue to consume additional power during this waiting period, compared with a substation that enters the low power sleep state directly on receiving a signal indicating termination of communications.

Figure 4:
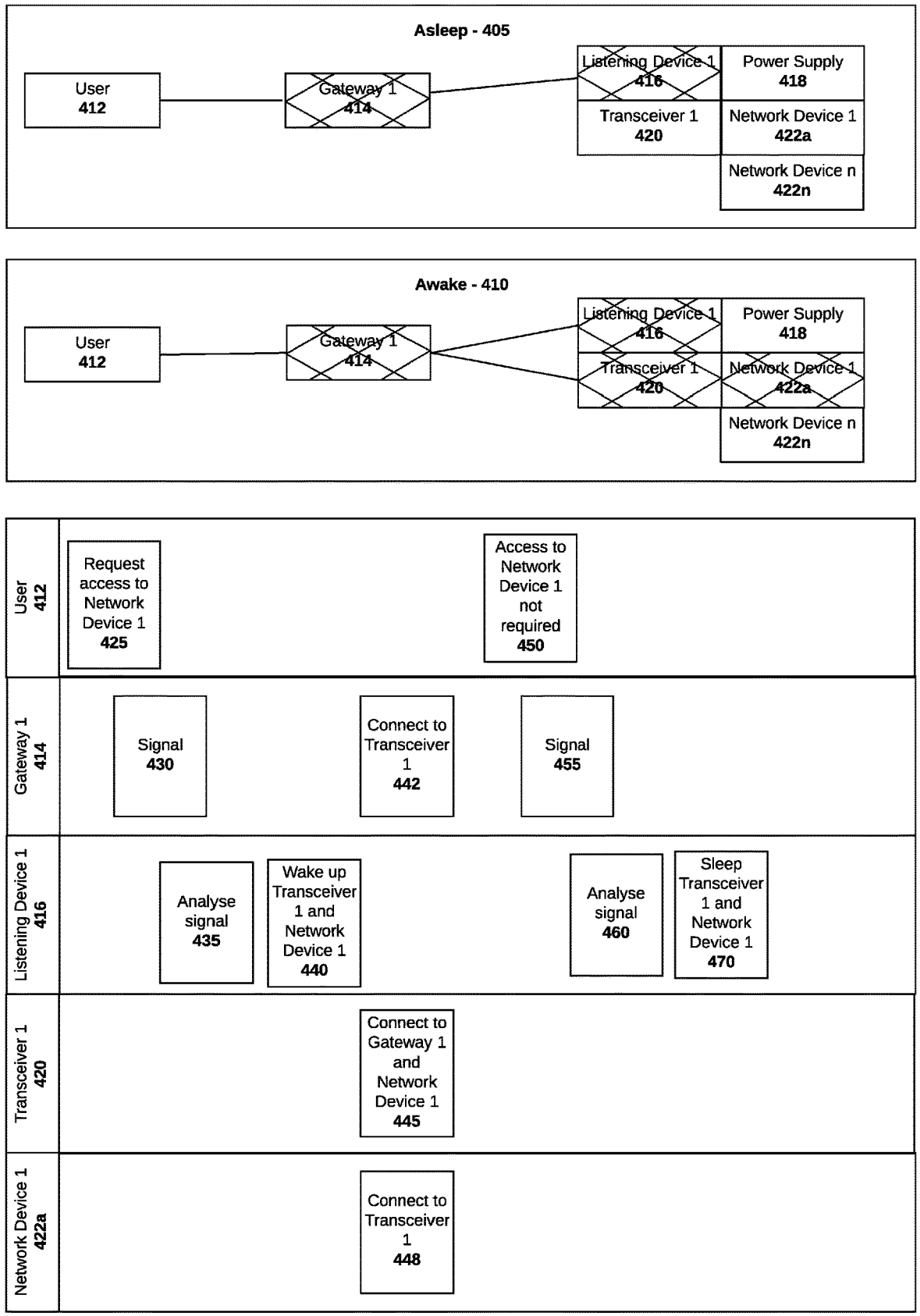
FIG. 4 shows an example of a power efficient network use case for remotely accessing an off grid network device.

FIG. 4 shows an example of a power efficient network use case for remotely accessing an off grid network device. In this example:
1. A subsystem comprising a listening device 416 with an integrated power control system 418 is configured to receive radio frequency traffic. In a dormant state the listening device 416 is enabled while other components 418, 420, 422*a-n* of the subsystem are disabled to conserve power.
2. When a user 412 needs to access 425 a network device 422*a-n* that is connected to the subsystem having a listening device 416, a gateway device 414 with an integrated transmitter sends a signal 430 that will be analysed by listening device. For example, and end user may access a software application via a phone, tablet, personal computer (PC) or other device, to trigger access to and view feed from remote cameras. The software application may be configured to initiate connection to a target camera address, and transmit a signal 430 via the device wireless communication functions (i.e. WiFi or other wireless communication protocol) or via a network gateway to request connection to the target network device 422*a-n*. The gateway 414 may be configured to recognize the need to send the signal 430 based on monitoring the network traffic or be specifically directed to wake up an on demand network topology. In one example the gateway 414 monitors traffic that the user is trying to send to 422*a-n* based on IP address and/or TCP/UDP ports and when it detects this it can send the required signal 430. Gateway 414 is an IP router capable of passing traffic between IP hosts on the same or different subnets, to complete this task it must process requests from clients to send traffic to specific local (MAC) and non local (IP) addresses. By programming 414 to associate specific addresses and/or ports with the signals that need to be sent to create the topology required to access these addresses Gateway 414 may be used as a device to detect the need for specific access, and as a device to create a signal that will, with the help of a listening device, result in the topology needed for this access to be created. For example, network device 1 422a, when active, is running a remote video server on 192.168.1.107 port 37776. Gateway 414 is programmed to associate IP address 192.168.1.107 port 37776 with the need for access to network device 1 422a. When User 412 attempts to access 192.168.1.107:37776 Gateway 414 transmits signal 430 containing information that tells listening device 416 to interact with power supply 418 in such a way that power is supplied to network device 1 422a.

In another embodiment the device 422a-n access request may be supported through a software application which directs wake-up of the on demand network.

3. When a signal 430 is received by the listening device 416 this signal is analysed 435 and where the signal 430 indicates access to network device 1 422a is required, the listening device 416 will trigger 440 wake up of transceiver 1 420 and network device 1 422a. Wake up of transceiver 1 420 enables a connection 442 to be established between transceiver 1 420 and the gateway 414, and through transceiver 1 420 a connection 445 to network device 1 422a is established allowing connection 448 for data communication between the user device 412 and the network device 422a via transceiver 1 420.

For example the signal 430 is the SSID transmitted by the gateway 414 in response to the user requesting access to a network connected device 422a, this SSID could identify not only the network requirements but the devices that are to be powered. In this example the user software application or gateway software may be programmed with one (or more) network paths to establish a data connection between the user device and the network connected device. The predefined network path information may be inserted into the SSID enabling targeted ad rapid wake up of the required subsystem devices. This may enable faster establishment of communication than embodiments where for each subsystem a link is established then using the in band communications to signal the wake up of a device. If the signals in the SSID (or anywhere in the broadcast signal that tells listening device to wake up network) it is not necessary to wait for network link to be created to power on the devices. The network path may be automatically selected by the originating device based on location of the originating device and target device. Where the originating device has a fixed location the device may have pre-programmed a preferred network topology for establishing a connection to the target device. Where a device is portable, such as a mobile phone, tablet or vehicle mounted gateway device the current device location may be utilised for selecting a preferred network topology, for example to selectively wake up a network topology starting from the subsystem proximate the device to the target device.

4. When a signal 455 is received by the listening device 416 that indicates access to network device 1 422a is no longer required 450 (for example the user 412 terminating the connection), the listening device 416 will trigger 470 putting transceiver 1 420 and network device 1 422a back to sleep 405. It should be appreciated that the listening device 416 may not actually be aware of user 412 terminating the connection, however this may be monitored by the gateway 414, for example the gateway 414 could monitor TCP/UDP connection status and when there is no traffic seen within 1 minute, the gateway assumes that the connection is terminated and automatically generates and sends a new signal 455 that causes listening device 416 to complete the same process outlined above, but this time it turns devices off 470.

Figure 5:
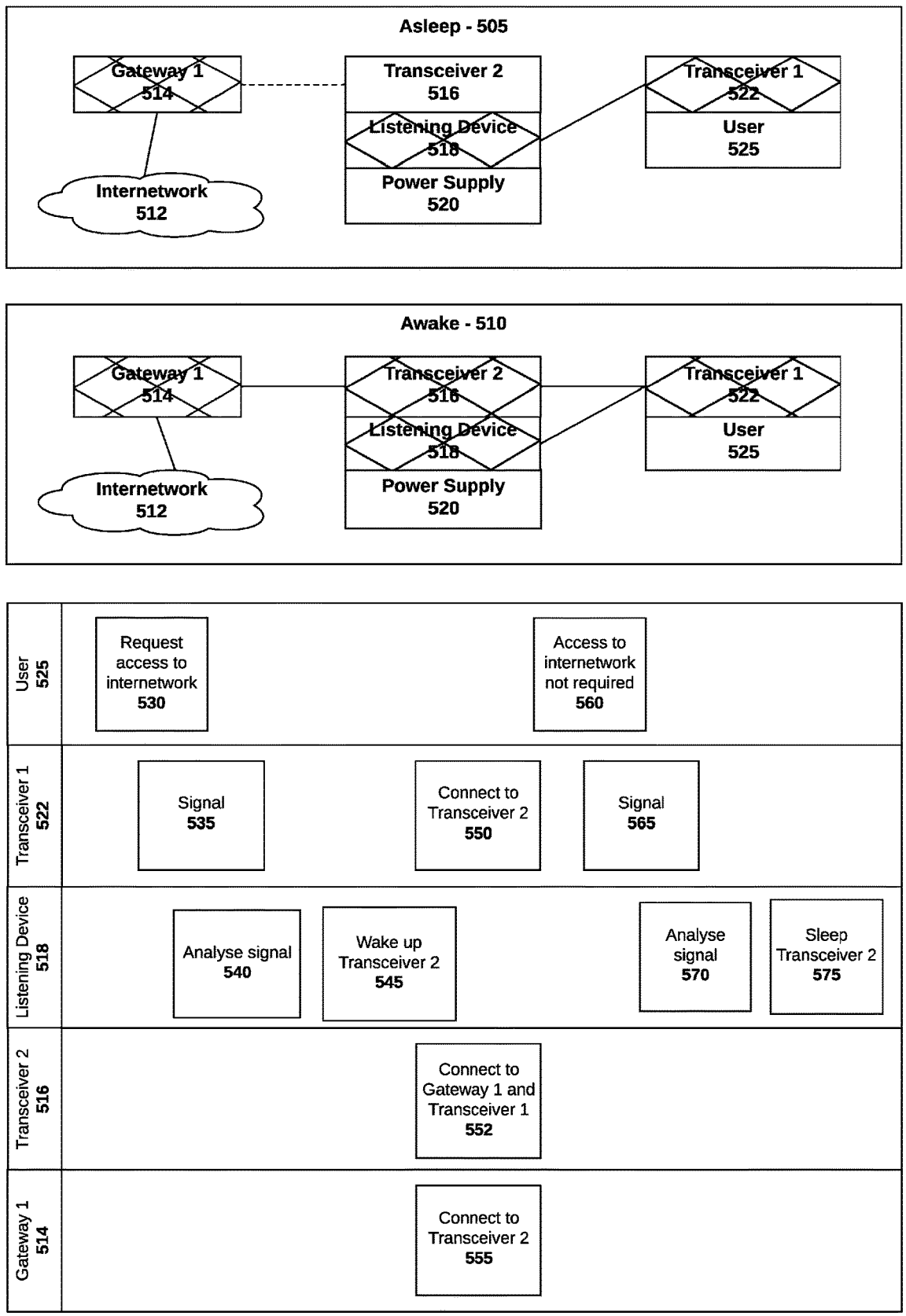
FIG. 5 shows an example of a long range network providing on demand access to an upstream network from an off grid location.

In the implementation example shown in FIG. 5 the long range network provides on demand access to an upstream network from an off grid location.

In this example:
1. A listening device 518 with an integrated power control system 520 is configured to receive radio frequency traffic. In one embodiment, it may be configured to scan 802.11 WiFi channels 1-11 for broadcast beacon frames.
2. An end user 525 is travelling in a vehicle equipped with Transceiver 1 522. When the user 525 needs to access an upstream network 530, Transceiver 1 522 sends a signal 535 that will be analysed 540 by the listening device 518.
3. When a signal 353 is received by the listening device 518 that indicates access to an upstream network is required 530, the listening device 518 analyses the signal in order to determine whether to trigger wake up of Transceiver 2 516 to create a link to Transceiver 1 522 and Gateway 1 514. When enabled this link enables the end user to access the upstream network on demand. In this embodiment, the analysis of signal 353 may include the channel that the SSID is broadcast on as well as the SSID value itself. In a point to point topology this signal may only serve to turn a network on and off. In a more complex physical topology this signal may contain the information needed to determine which specific device or devices will be connected in order to from a topology that meets the requirements as specified in the signal. These requirements may be based on power savings, speed, cost or other metrics that define a 'desirable' network topology. As the metrics within the network environment change, the 'desirable' network topology may change and signal 353 may be changed to reflect these changes resulting in an adaptive network topology.
4. When a signal 565 is received by the listening device 518 that indicates access to the upstream network is no longer required 560, the listening device 518 will put Transceiver 2 516 back to sleep 505. In this embodiment, this signal may be a specific SSID that is transmitted or the continued absence of an SSID containing a valid signal 353.

Figure 6:
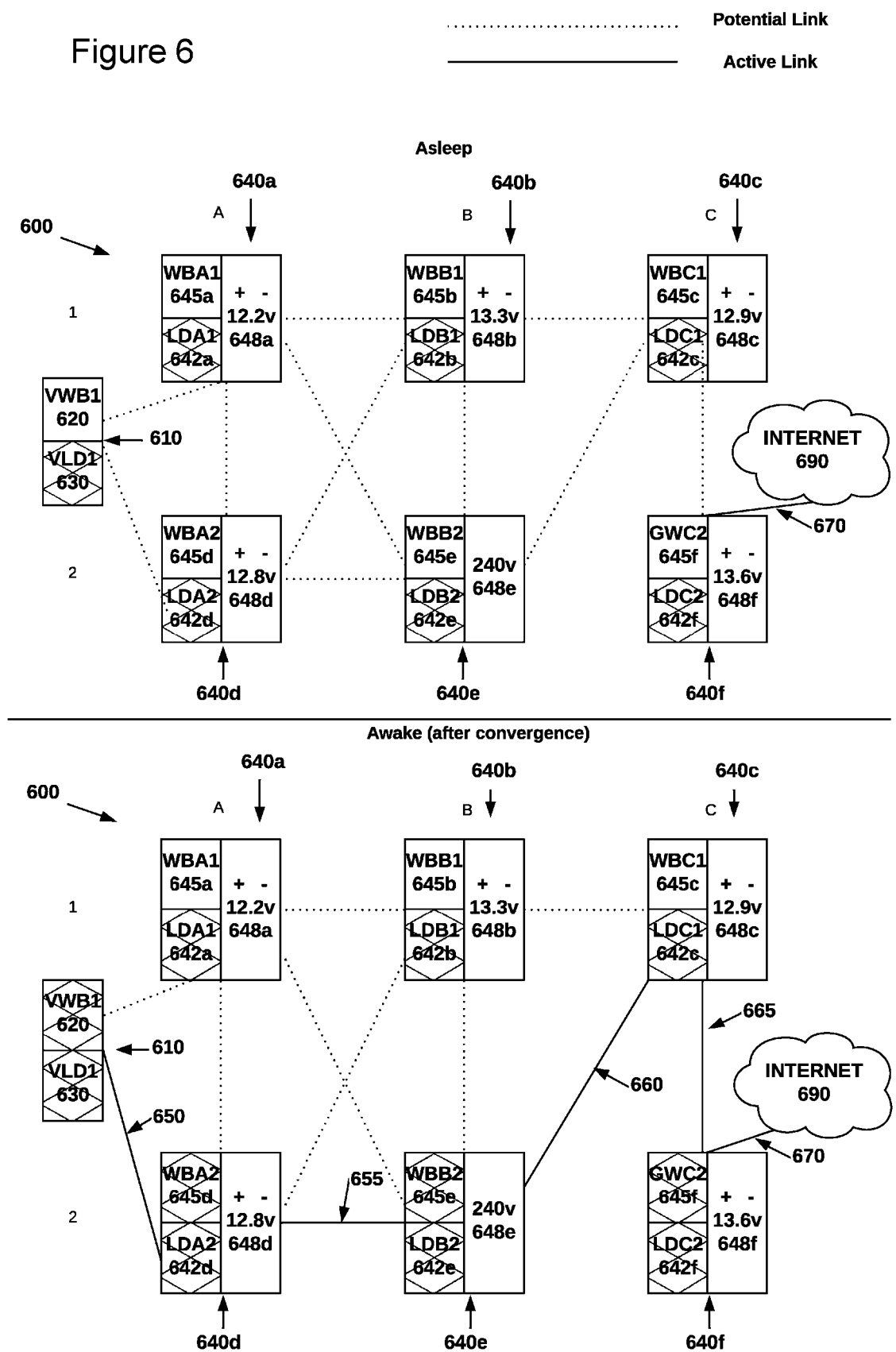
FIG. 6 is a block diagram illustrating how this technology can be used to create a 'sleepy network'—a power efficient, on demand network with an adaptive physical network topology that responds to the requirements of one or more roaming clients.

FIG. 6 illustrates how this technology can be used to create a 'sleepy network'—a power efficient, on demand network with an adaptive physical network topology that responds to the requirements of one or more roaming clients.

Some examples of operation are explained in further detail below. In a first example an end user 170 is driving around a large rural property in a vehicle 160 containing a wireless bridge 140. The property has multiple listening devices and wireless bridges 100 installed in an approximate grid format that enables the creation of a mesh network topology.

FIG. 6 is a block diagram, representing a an example of a network topology 600 with the vehicle unit 610 comprising a wireless bridge 620a and listening device 630a, and a plurality of subsystems 640a-f each having a listening device 642a-f, wireless bridge 645a-f and power supply 648a-f, each of these subsystems being capable of establishing wireless connections (possible connections represented as dotted lines) to at least one other subsystem within the network 600. The subsystems in this example are all configured as wireless bridges but other transceiver configurations may be used and vary between substations within a network, for example wireless access points, hubs etc. These subsystems 640*a-f* also include one or more processors (not shown) to implement the functionality of the power controller, listening device signal analysis, and any other required functionality, such as controlling peripheral devices. It should be appreciated that separate processor hardware may be used for implementing some functionality to allow hardware to be powered down when not required, to minimise the power consumption during dormant states. The configuration may vary between embodiments.

If all wireless bridges 645*a-f* were enabled at all times, their power utilisation would require significant battery storage and a sizeable renewable energy based recharging system. Instead, a low powered listening device 642*a-f* can be enabled at substantially all times, and these 642*a-f* will be used to wake up and configure wireless bridges 645*a-f* as required to build a dynamic network topology that meets end user requirements while conserving power.

When the broadcast frame 650 from the vehicle's wireless bridge 620 is received by a listening device 642*d* the network will 'wake up' by selectively enabling connections between wireless bridges, for example to connect the unit 610 to the internet 690. Receipt of the broadcast frame 650 from the vehicle mounted wireless bridge 620 by listening device 642*d* will trigger wake up of the wireless bridge 645*d* connected to the listening device 642*d*. In response to this wake up, a signal is transmitted via the wireless bridge 645*d* and received by the listening device 642*e* of the next subsystem 640*e* to, in turn, trigger wake up of the wireless bridge 645*e* and establish connection 655. It should be appreciated that the signal transmitted by subsystem may also be received by the listening devices of subsystem 640*a* and 640*b*, but not result in wake up of these subsystems, for example based on predefined network topology or analysis of the signal data by the respective listening devices 642*a*, 642*b* and determining that the substations are not to be included in the communication path based on information in the signal, for example where the SSID indicates a different target path, based on target destination, based on signal origin etc.

Once woken up wireless bridges can be programmed or controlled by listening devices to broadcast a Service Set Identifier (SSID) based on the status of the environment including the wireless networks that are in range, hop count to a gateway and the voltage available to the wireless bridge and to upstream devices.

The broadcast frames sent by a wireless bridge will be received by other listening devices, which will in turn wake up other wireless bridges and program them to broadcast an SSID based on the current status of the environment. This process will continue until all in range wireless bridges have been woken up. In this example, subsystem 640*c* triggers wake up of subsystem 640*c* to establish path link 660, in turn subsystem 640*c* wakes up 640*f* to establish path link 665. Subsystem 640*f* may also operate as a wireless access point for connection 670 to the internet 690.

The Service Set Identifier (SSID) field in these broadcast frames will continue to be evaluated by listening devices and decisions will be made whether to continue to provide power to a wireless bridge and whether to update the SSID transmitted by the wireless bridge.

As the vehicle's wireless bridge moves beyond range of one listening device, possibly into the range of others, further changes will be made to the network topology under the direction of various listening devices. The resulting dynamic network topology enables power to be conserved by leaving wireless bridges powered off until they are required.

An example of the configuration of various components is given below.

1. Vehicle access point configuration.
   a. A vehicle's 12 v power supply is connected to a wireless access point VAP1.
   b. The wireless access point creates an 802.11 compatible wireless network with an SSID of 'vehicleAP'.
   c. Mobile phones, tablets, computers and any WiFi compatible equipment can connect to this wireless network.
   d. The AP is connected by an Ethernet cable to a wireless bridge VWB1 620.
   e. The AP is connected by an Ethernet cable to a listening device VLD1 630.
   f. The Ethernet ports connecting the AP and the wireless bridge and listening device are configured as an Ethernet bridge.
   g. Wireless bridge VWB1 620 is initially configured to broadcast a wireless network with an SSID of 'VWB1awake'.
   h. Vehicle Listening Device VLD1 630 is configured to scan for available wireless networks
   i. Vehicle Listening Device VLD1 630 is configured with SSH (secure shell) credentials and a fixed IP address that enable it to access VWB1 620 for the purpose of making configuration changes
   j. When a broadcast packet from an in range wireless network is received by Vehicle listening device VLD1 630 it will inspect the contents of the SSID field
   k. When an SSID is discovered that is advertising a link to a gateway VLD1 630 will program VLD1 630 to access that network as a client.

2. Listener device interaction with remote wireless bridges
   a. Listening Devices are low powered wireless receivers that run constantly or on a fixed schedule
   b. Listening Devices are configured to receive broadcast frames
   c. Listening Devices have the ability to provide power to other devices using Power over Ethernet (PoE)
   d. When a Listening Device receives a broadcast frame with an SSID the Listening Device evaluates the contents of the SSID and makes a decision whether to change the power status of local bridges (FIG. 3—Listener device SSID decision tree)

3. Listener device interaction with Local Wireless Bridges
   a. Listening Devices can be physically connected by Ethernet cables to a wireless bridge, the ports connected to the wireless bridge are disabled by default. (for example as illustrated in the block diagram of FIG. 4 representing a listening device 416 connected to wireless bridge 420) In some embodiments the listening device and wireless bridge may be integrated into the same package, with the wireless bridge functionality able to be selectively switched to a low power consumption mode. In an embodiment the listening device functionality may be implemented in the transceiver, for example the transceiver configured to shut down transmission to reduce power consumption while reception remains enabled for listening device functionality.
   b. As illustrated in FIG. 3, the listening device can enable a Local Wireless Bridge by changing the port status from disabled to enabled or disable a Local Wireless Bridge by changing the port status from enabled to disabled.

c. Once enabled a Local Wireless Bridge can be programmed by a Listening Device to update their advertised SSID or join an advertised network.

4. Back to sleep process a. A Listening Device can be configured to interrogate the Local Wireless Bridge to determine whether a link is in use and the status of links to Remote Wireless Bridges.

b. A Listening Device can be configured to trigger cut off power to the Local Wireless Bridge when it is determined that the link is no longer in use (as determined by the amount of time that has passed since client traffic has been sent or received)

c. A Listening Device can be configured to cut power to the Local Wireless Bridge when it is determined that there is no longer a link available to a Remote Wireless Bridge (as determined by the amount of time that has passed since the expected SSID has been detected in a broadcast packet)

Figure 7A:
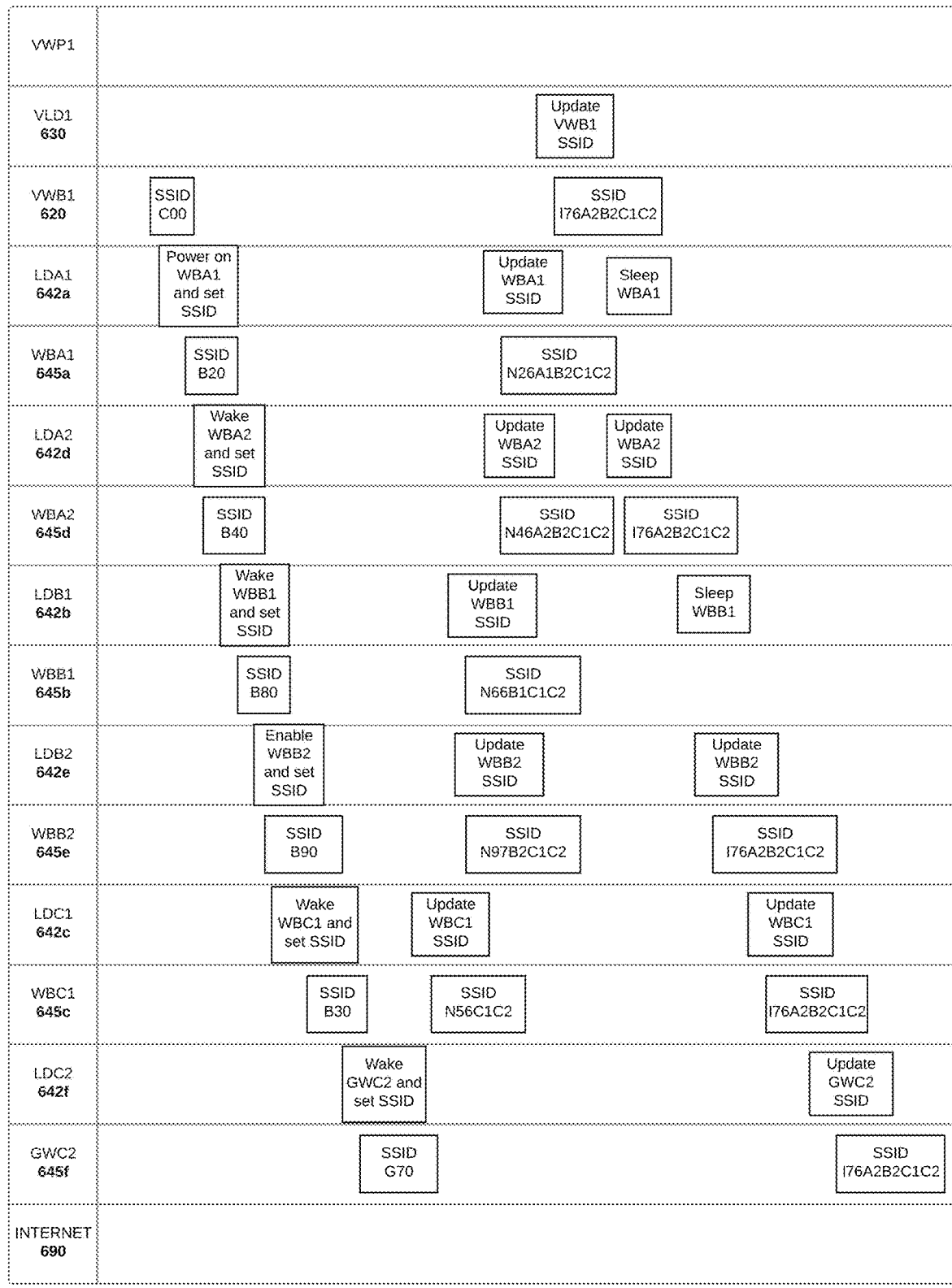
FIG. 7 is a swim lane diagram representing a process for dynamic network topology creation.

An example of the above process is implemented is provided in FIG. 7, which is a swim Lane Diagram showing Dynamic Network Topology creation.

Detailed example of how this technology can be used to enable on demand access from a remote access point VWP1 via one or more wireless bridges to a gateway GWC2 to an internet (including the internet) is provided below.

Vehicle access point VWP1 is functionally connected to vehicle listening device VLD1 and vehicle wireless bridge VWB1.

A user within proximity of access point VWP1 connects to VWP1 and attempts to connect to an IP address not accessible directly from access point VWP1, this acts as a signal to wireless bridge VWB1 to wake up the network. Alternatively the signal could be received by listening device VLD1 which would pass a signal to vehicle wireless bridge VWB1.

Vehicle wireless bridge VWB1 transmits SSID C00 (as per SSID format table indicating it is a client C i.e. a device looking for a path to an upstream network with device power status of 0 unknown and upstream network power status of 0 unknown.

Listening device LDA1 is in range of the signal sent by VWB1 and receives the C00 SSID broadcast by VWB1 and analysis of this signal determines that there is a device looking for an upstream network, resulting in wireless bridge WBA1 being powered on by LDA1 and WBA1 being configured with SSID B20 representing the fact that it is a bridge device seeking a network with a device power status of 2 indicating there is power available to LDA1 with current voltage of 12.v-12.2 v (see FIG. 6 and SSID table in FIG. 7). As there is no available path to a gateway a network power status of 0, representing unknown is assigned.

Listening device LDA2 is in range of the signal sent by VWB1. Listening device LDA2 receives the C00 SSID sent by VWB1 and analysis of this signal determines that there is a device looking for an upstream network, resulting in wireless bridge WBA2 being powered on by LDA2 and WBA2 being configured with SSID B40 representing the fact that it is a bridge device seeking a network with a device power status of 4 (12.51 v-12.8 v). As there is no available path to a gateway a network power status of 0, representing unknown is assigned.

Listening device LDA2 is also in range of the signal sent by WBA1 (and listening device LDA1 is also in range of the signal sent by WBA2). If these signals are received before the signal sent by VWB1 the same outcome will occur—the listening device will detect that there is a signal indicating a device seeking access to an upstream network and the listening device will cause its local bridge to be powered on and to transmit a signal as per the SSID table indicating to other in range devices that there is a device seeking upstream network access and informing in range devices of its own power status.

This continues until all in range devices are awake

One of the in range devices is gateway GWC2—a gateway device with access to the upstream network—for example, the Internet. When listening device LDC2 detects a signal indicating upstream network access is required, in this example from wireless bridge WBC1, it will cause gateway GWC2 to power on and GWC2 to broadcast SSID G70 indicating it is a gateway connected to a power source with 13.6 v available and that the network power status is as yet unknown.

Listening device LDC1 receives the signal from gateway GWC2 and analyses it. The information in the SSID results in LDC1 reprogramming wireless bridge WBC1 with the signal/SSID N56C1C2 indicating to in range devices that it is offering a path to an upstream network (N), that is has a local power status of between 12.81-13 v (5), that average power status of the network path, including itself is likely to be between 13.01-13.4 v (6) and that the path it is offering to the upstream network makes use of devices at C1 and C2.

The signal broadcast by wireless bridge WBC1 is received by in range listening devices LDB1 and LDB2. As a result listening device LDB1 reprograms wireless bridge WBB1 to broadcast SSID N66B1C1C2 and listening device LDB2 reprograms wireless bridge WBB2 to broadcast SSID N79B2C1C2.

The signals broadcast by wireless bridges WBB1 and WBB2 will be received by listening device LDA1. Evaluation of these signals will result in listening device LDA1 reprogramming wireless bridge WBA1 to broadcast SSID N26A1B2C1C2. Note that LDA1 has selected the path through wireless bridge WBB2 as it has a better network and local power status compared to the alternative offer from wireless bridge WBB1. Also note that while in this embodiment only local and path power are being evaluated the same signalling and evaluation method may be used with other metrics such as signal strength, reliability etc to determine the 'best' path.

The signals broadcast by wireless bridges WBB1 and WBB2 will also be received by listening device LDA2. Evaluation of these signals will result in listening device LDA2 reprogramming wireless bridge WBA2 to broadcast SSID N46A2B2C1C2.

The signals broadcast by wireless bridges WBA1 and WBA2 will be received by vehicle listening device VLD1 which will evaluate the signals, determine there are two offers available, select the most favourable offer and reprogram wireless bridge VWB1 to broadcast SSID I76A2B2C1C2. This SSID/signal indicates that a internetwork topology has been accepted by the client (I), the power status of the client (7), the starting power status of the network (6) and the path accepted by the client (A2-B2-C1-C2)

The signal will propagate throughout the network in the same manner as the original signal broadcast by the client.

Listening devices will evaluate this signal and if they find they are part of the network they will change the SSID/signal of their functionally connected wireless devices (bridges/gateway to match the SSID dynamically creating the topology requested by the client. If the signal indicates they are not required to participate in the network the listening device will instead sleep/turn off their functionally connected wireless devices (bridges/gateways)

The resulting 'awake (after convergence) topology will be used until a device sends a signal that it no longer needs or is no longer able to participate in the network. Upon receipt of this signal devices will propagate the signal in the manner described above.

If the client initiates or rebroadcasts the sleep signal SSID (S) devices will rebroadcast for a short time before putting functionally connected wireless devices to sleep.

If the client requires continued access to an upstream network it will instead start the process again with a (C) SSID causing this process to run again to form an alternative topology.

An embodiment provides a system and method whereby a device can listen for SSIDs and, when a packet is received advertising an SSID in a known format the device can power up and optionally configure other parts of the system (e.g. transmitter, AP, connected nodes).

A listening device upon detecting a known SSID can cause power to be provided or increased to a transmitter integrated into the same system as the listening device. A possible application for this embodiment is creation of long range wireless networks on demand in a way that reduces the power use of APs.

In another embodiment a listening device detects a known SSID subsequently causes power to be sent to an external AP will create a wireless link to the device broadcasting the SSID. A possible application for this embodiment is the automatic creation of a wireless link between an off grid location and a central internet gateway in a way that requires only enough power for the remote location to run the network while it is in use.

In yet another embodiment, a listening device upon detecting a known SSID will cause power to be sent to an AP and a device connected to the AP (e.g. an IP camera). A possible application for this embodiment is the automatic creation of a wireless link to a remote wirelessly connected IP camera in a way that requires only enough power for the remote location to run the network and camera while it is in use.

In still yet another embodiment, a listening device upon detecting a known SSID (a) will cause power to be sent to an AP(1) and will instruct AP(1) to broadcast a specific SSID (b). A second listening device will receive a packet from AP1(1) and subsequently instruct another AP(2) to broadcast a specific SSID (c). This process will continue while SSID (a) is visible to AP(1). AP(1) will be powered off when SSID (a) has not been seen for specified number of seconds causing SSID (b) to no longer be broadcast. AP(2) will in turn be powered off when SSID (b) has not been seen for specified number of seconds and so on. A possible application for this embodiment is enabling a user with a mobile AP in a vehicle to create on demand multi-hop wireless networks back to a central internet gateway.

In another embodiment multiple physical network paths can be made available to an end user enabling greater bandwidth between locations on the local network on a temporary, permanent or on demand basis. For example, in response to a network access request, more than one communication path may be "woken" and made available to increase the available bandwidth, for example, for streaming or downloading video from a remote monitoring camera connected to a node of the network. Additional paths may be woken based on the remote data source bandwidth requirements or preferences, or the required an with may be a parameter specified in the network access request.

Optionally, additional bandwidth can be enabled using additional gateways between locations on the network and locations beyond the local network. From a practical point of view, this could enable multiple farms to share bandwidth constrained satellite connections with each other facilitating increased temporary 'burst' speeds for some or all network hosts.

In another embodiment, some or all end user devices could have connectivity constrained to a limited amount of bandwidth (Quality of Service/QoS) and/or limited functionality (e.g. a firewall enabling WiFi Calling only). From a practical point of view, this could enable on demand communications services in regions with limited mobile phone coverage for members of emergency services and/or members of the public.

In another embodiment, some listening devices and/or APs are located in moving vehicles such as cars, trucks or tractors enabling these listening devices/APs to act both as a client and as a moving part of the network infrastructure to enable on demand connectivity for other devices in locations within range of the moving vehicle. This could have significant applications for example in emergency management and fire fighting. In this example, an access points in emergency vehicles may enable temporary extension of the power conserving network beyond the farm installed infrastructure, to enable mobile phone use by the emergency service workers to be routed to the telecommunication network via the farm network and fame access gateway. In some embodiments mobile phones may be programmed (using software) to operate as nodes of the power conserving digital network. It should be appreciated that mobile phones include all of the required hardware functionality (processors, transceivers, power supply etc.) required for a node of the power conserving network, so could be programmed using software to operate to relay data similarly to other nodes of the power conserving network.

In another embodiment, some listening devices and/or APs are located upon a portable mast or other moveable structure enabling these listening devices/APs to act both as a client and as a movable part of the network infrastructure to enable on demand connectivity for other devices in locations as required. This could have significant applications for example in livestock monitoring. Portable wireless transceiver subsystems may be vehicle mounted or stand alone, for example to allow temporary establishment of a network. This may be advantageous for circumstances such as emergencies, during construction (before permanent network infrastructure is installed), exploration or scientific research where the network may be desirable for a short time or specific purpose and then removed. Portable wireless transceiver subsystems may also be mounted on vehicles.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

Another embodiment may be configured to determine network access requests based on general radio spectrum characteristics instead of or in addition to SSID (e.g. is there more traffic at 2412 MHz than there was before) and uses this information as the indicator to change the network configuration.

It should be appreciated that the described long range network is not suitable for application in all areas. The network is not suitable for "always on" applications. This network is only suitable for networks that are needed intermittently on demand. For embodiments using a received signal spectrum profile to detect when to turn network on, the RF environment for installation of the network needs to quiet, for example at least compared to the city, typically such conditions can be found in rural or remote areas/off grid locations which don't usually have a lot of wireless equipment running. Embodiments may also be deployed on bodies of water (for example lakes or bays) using buoy or pontoon mounted transceiver subsystems.

Embodiments of the described long range wireless networks are highly suitable for installation on larger farms. However the system may also be suitable for many other applications, for example to enable extension of communication networks into rural and remote communities, forested areas, national parks, ocean fish farms, defence, bushfire or other forestry monitoring etc.

Embodiments of the disclosed power conserving adaptive topology long range networks may offer advantages in:
  Blackspot elimination (using voice over wifi)
  Blackspot elimination (internet browsing)
  Internet backhaul (provide NBN connection to wider geographic area)
  Remote video (i.e. on demand access to CCTV cameras)
  Drone infrastructure (eventually—once drone range is there and legislation catches up—drones won't be able to talk back to a base station without repeaters, this tech is perfect for those repeaters).
  Telemetry (once the network is installed for one of the above uses it would also be used for telemetry)

Embodiments of the system as described may be suitable for installation in a variety of different areas and applications including but not limited to:
  Large farms/stations/ranches
  Small farms
  Large 'lifestyle' blocks
  Villages
  Rural and remote communities
  Highways
  National parks
  Disaster/emergency communications
  Mining
  Defence Embodiments may be configured to operate with wireless cameras that are becoming commercially available, for example Dahua, Hikvision and the other cameras.

Embodiments may be configured to use timers to schedule turn on subsystems in some embodiments, for example a subsystem powered by a solar generator with battery backup may be configured to turn on, or turn on at least some attached equipment such as cameras, during the day. In some embodiments some of the network topology may be permanently enabled during daylight hours—for example around work buildings, higher use areas, or access corridors. The turn on may be intermittent, for example to capture an image of a paddock each 15 minutes this may be stored on local storage (for example a solid state storage media) for later perusal or download via the network. The system may also be configured to automatically "wake up" the network topology for routine polling of subsystems for maintenance purposes, periodic data download, power supply updates, scanning cameras etc.

In another embodiment proximity sensors, motion sensors, magnetic switches or other sensing devices may be utilised to detect physical presence, a disturbance or other interesting events near a subsystem and in response trigger the subsystem to "wake up" to at least some extent to trigger wake up of network and optionally turn things on such as cameras or data recorders for capture of data for transmission via the network to an end user or data log. For example, motion detection may trigger turn on of the subsystem and a connected camera to capture images—for example of animals or vandals in a crop paddock. The images from the camera can be saved locally for later download or transmitted via the network to a user device (such as a mobile phone or home computer) and/or to a data store (which may be cloud storage). Alternatively, proximity or movement detection may trigger automatic switch on of a section of the network to enable detection of any network device (i.e. mobile phone, laptop, tablet, wireless camera etc.) and automatically establish a network connection for the device (analogous to automatically connecting to WiFi, but with the wireless network having to wake up first).

Embodiments may utilise a long range low bitrate power efficient RF protocol/technology (like LoRa) to create a second out of band network that is used to power up the high bandwidth network. This embodiment presents additional infrastructure, and integration challenges making the technology more complex.

Embodiments may be configured to have equipment turn on intermittently and check a cloud server for a 'status' e.g. turn on every minute for 10 seconds to see if it is needed then turn off again if not. This embodiment may be less power efficient and exhibit latency due to the intermittent turn on. Synchronising devices for simultaneous turn no may also present challenges.

Prototype embodiments can be made using off the shelf hardware such as RBmAP2nD https://mikrotik.com/product/RBmAP2nD or a Raspberry Pi/Arduino with WiFi shield etc. and implementing power control functionality by modifying system software. For example by writing a script that runs on a schedule and turns the radio interface on intermittently and only leaving it on if a specified network is available (as indicated by SSID or by a spectrum analysis).

Another prototype embodiment would involve using the same device to provide power to a directional radio like the SXT (https://mikrotik.com/product/RBSXTG-5HnD) when the RBMAP2nd detects a network is available. Another embodiment would use the same devices and adding an IP camera that could be powered over the same voltage that is powering the RBMAP2nd and turning on the camera when the wireless network becomes available (indicating someone wants access to the camera).

Another superior prototype embodiment may be implemented by modifying the RBMAP2nD or a similar device to fire a relay (that is wired to circuit board where the LEDs are supposed to be—the LEDs can be turned on or off in this device so can be repurposed to use a relay).

Embodiments may also be implemented using custom built devices optimised for low power/listen only/low cost
1. that just turns other devices on/off
2. that can change the configuration of other devices Embodiments may be configured to monitor the substation power supply voltage, for example, the power controller or listening device monitoring local power supply status and waking the network based on this status. For example, to send an alarm based on status, such as battery charge level, charging problems, or generator failures. For example, this could be battery voltage dropping below a level, or charging voltage from a renewable energy source being outside range indicating correct operation. Monitoring of power status may also enable turning on subsystem when power supply is reliable, for example when a solar power generator is operating during the day, to reduce wake up delays or network latency due to wake up. For example, this may allow the network to remain active in good power supply conditions (i.e. a sunny or windy day depending on the generators) for routine data transfer or software updates. For example, in some embodiments peripheral devices used for data capture (cameras, weather stations etc.) may be configured to store data for forwarding when triggered by the network or in response to manual request. Triggering of such data transfer may be automatic when the network is activated in response to good power generating conditions. Might as well also put in a more general 'power status' because voltage could be derived from amperage, wattage etc. Similarly, software updates may be scheduled for dissemination through the network when the network is activated in response to good power generating conditions.

Embodiments may be implemented which include a network security feature whereby only authorised devices may trigger wake up of the network. In one such embodiment a key may be shared with authorised devices, the authorisation key, for example a hashed value, is included in the network access request signal (such as the SSID) to be used for validation by the listening device, and the network only enabled in response to positive verification of the authorisation key. Thus, based on a pre-shared key it would be possible for a listening device to confirm the veracity of the broadcast signal. In another embodiment the security feature could depend upon standard WiFi security features for example WPA2 PSK, enabling devices to be authorised through the act of connecting to the WiFi network.

In some embodiments the substation includes a controller (which may be integrated with the listening device and/or power controller) configured to control peripheral equipment connected to the substation. This may include control of peripheral devices responsive to an action requested in signal data, for example turning on a pump or taking and emailing a photograph. Alternatively, the controller may be configured to control operation of peripheral devices even when the substation is "off line" without the transceiver turned on. This may be referred to a as semi dormant, semi-sleep, or semi-awake state. For example, the controller may be configured to cause a pump to turn on at certain times of the day, or to cause a gat to open. The actions controlled by the controller may be dependent upon power supply status, for example turn on the pump only when the solar power generator is supplying sufficient energy to run the pump. The controller may only send a trigger signal to an independent peripheral device controller, for example an "on" signal to a pump controller. This may be configured to control operation of peripheral devices even when off line.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be understood to persons skilled in the art of the invention that many modifications may be made without departing from the spirit and scope of the invention.

The invention claimed is:

1. A low aggregate power consumption wireless network comprising:
    a plurality of wireless transceiver subsystems systems configured for distributed installation within a physical region, each transceiver subsystem comprising:
        a listening device configured to receive radio frequency transmissions;
        a wireless transceiver; and
        a power controller operatively connected to the listening device and the wireless transceiver, the power controller being configured to cause the wireless transceiver to assume a low power sleep state and transition to an awake state in response to a trigger from the listening device,
        wherein the listening device being configured to monitor received transmissions for a network access request signal, indicative of a need for utilisation of the wireless transceiver, and in response to receiving the network access request signal, trigger the power controller to cause transition of the transceiver from a sleep state to an awake state, whereby network communication functionality is enabled for the subsystem,
        wherein each transceiver is configured to monitor signal power and trigger a handover to another subsystem in response to low signal power, and
        wherein the listening device of each subsystem is configured to receive handover signalling as a network access request and if the subsystem is in the sleep state trigger transition of a subsystem to a wake state for the handover.

2. A low aggregate power consumption wireless network as claimed in claim 1 wherein each subsystem while in the awake state is configured to transmit a network access request signal, to thereby trigger wake up of at least one other subsystem within range of the network access request signal.

3. A low aggregate power consumption wireless network as claimed in claim 2 wherein one or more of the subsystems are configured to transmit an access request signal to selectively cause wake up of another subsystem.

4. A low aggregate power consumption wireless network as claimed in claim 2 wherein at least one subsystem is configured to connect with a second network providing access to a public communication network.

5. A low aggregate power consumption wireless network as claimed in claim 4 wherein on transitioning to a wake state the transceiver is configured to determine whether or not the subsystem is receiving signals from another active subsystem or a subsystem of a second network, and determine whether the subsystem is to operate as a relay between subsystems and the second network.

6. A low aggregate power consumption wireless network as claimed in claim 5 wherein each subsystem is configured to trigger wake up of one or more subsystems in accordance with a target network topology to establish a communication path between the second network and an end user device used to access the network via a subsystem.

7. A low aggregate power consumption wireless network as claimed in claim 1 wherein the network access request signal monitored by the listening device may be characterised by any one or more of: one or more specified frequencies, SSID, or bridge interaction.

8. A low aggregate power consumption wireless network as claimed in claim 7 wherein the listening device is configured to operate in any one of the following modes while monitoring for network access request signals: always on, periodic scanning, or intermittent sleep.

9. A low aggregate power consumption wireless network as claimed in claim 1 wherein while in the wake state the transceiver is configured to monitor for cease of communication via the transceiver and trigger transition to the low power sleep state.

10. A low aggregate power consumption wireless network as claimed in claim 9 wherein a sleep signal is transmitted by the transceiver before transitioning to the low power sleep state to optionally cause a transition sleep state of other subsystems where these are not active for another communication via another subsystem.

11. A low aggregate power consumption wireless network as claimed in claim 1 where one or more subsystems are configured for connection of peripheral devices, and the power controller is further configured to control transitioning of peripheral devices between awake and sleep states.

12. A low aggregate power consumption wireless network as claimed in claim 11 wherein the power controller can be configured to transition the peripheral devices between awake and sleep states independently of the transceiver.

13. A low aggregate power consumption wireless network as claimed in claim 1 wherein at least one subsystem is further configured to operate as a wireless bridge or wireless access point.

14. A low aggregate power consumption wireless network as claimed in claim 1 further comprising a vehicle mounted subsystem comprising a wireless bridge or wireless access point.

15. A low aggregate power consumption wireless network as claimed in claim 1 wherein any one or more of the wireless transceiver subsystems are portable.

16. A wireless transceiver subsystem configured for distributed installation within a large physical region, each transceiver subsystem comprising:
   a listening device configured to receive radio frequency transmissions;
   a wireless transceiver; and
   a power controller operatively connected to the listening device and the wireless transceiver, the power controller being configured to cause the wireless transceiver to assume a low power sleep state and transition to an awake state in response to a first trigger from the listening device,
   the listening device being configured to monitor received transmissions for a network access request signal, indicative of a need for utilisation of the wireless transceiver, and in response to receiving the network access request signal, trigger the power controller to cause transition of the transceiver from a sleep state to an awake state, whereby network communication functionality is enabled for the subsystem, and
   wherein each transceiver is configured to monitor signal power and trigger a handover to another substation in response to low signal power, and wherein the listening device of each subsystem is configured to receive a handover signalling as a network access request and if the subsystem is in the sleep state trigger transition of a subsystem to a wake state for the handover.

17. A wireless transceiver subsystem as claimed in claim 16 wherein the listening device and power controller are integrated.

18. A wireless transceiver subsystem as claimed in claim 16 wherein the wireless transceiver and listening device are integrated with the listening device using only receiver functionality of the transceiver.

19. A wireless transceiver subsystem as claimed in claim 16 further comprising a power supply comprising one or more batteries and connectable to a charging source.

* * * * *